United States Patent Office 3,499,856
Patented Mar. 10, 1970

3,499,856
ANTISTATIC AGENT COMPRISING A MIXTURE OF A TERTIARY AMINE CARBOXYLATE AND A HIGHER ALIPHATIC ALCOHOL AND A RESIN COMPOSITION CONTAINING SAME
Makoto Funatsu, Wakayama-shi, and Yasuhiro Torimae, Wakayama, Japan, assignors to Kao Soap, Ltd., Tokyo, Japan, a corporation of Japan
No Drawing. Filed Jan. 13, 1967, Ser. No. 608,972
Claims priority, application Japan, Jan. 17, 1966, 41/2,477
Int. Cl. C08f 3/30, 3/04, 3/08
U.S. Cl. 260—23                                    4 Claims

ABSTRACT OF THE DISCLOSURE

An antistatic composition for incorporation in synthetic resins comprising a tertiary amine carboxylate of the formula:

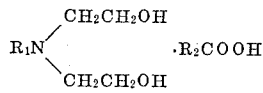

wherein each of $R_1$ and $R_2$ is an alkyl or alkenyl group of 8 to 22 carbon atoms, said antistatic composition being comprised of a mixture of a tertiary amine carboxylate as aforesaid and a higher alcohol of the formula:

$$R_3OH$$

wherein $R_3$ is an alkyl or alkenyl group of 8 to 22 carbon atoms.

---

This invention relates to a method of preventing the accumulation of charges of static electricity in synthetic resins, such as polyethylene, polypropylene or soft vinyl chloride resin, by incorporating therein an antistatic agent composition. More particularly the present invention relates to an antistatic method as aforesaid characterized by incorporating a new antistatic agent composition, such as is mentioned below, in a synthetic resin formulation. Further, the present invention relates to antistatic agent compositions as are mentioned below.

The antistatic agent compositions according to the present invention include an antistatic agent composition comprised essentially of a mixture of a tertiary amine carboxylate represented by the following general formula

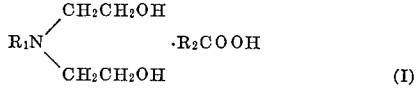 (I)

wherein $R_1$ and $R_2$ is an alkyl or alkenyl group of 8 to 22 carbon atoms respectively and a higher alcohol represented by the following general formula $$R_3OH \quad (II)$$

wherein $R_3$ is an alkyl or alkenyl group of 8 to 22 carbon atoms.

It is necessary that an antistatic agent for synthetic resins should have an antistatic property and at the same time it should not impair, and preferably it should improve, properties inherently required of plastics, such as antiblocking property, printing characteristics and heat-sealability. However, there has been found no antistatic agent satisfying all these requirements.

For example, an alkyl (or alkenyl) dihydroxyethylamine represented by the formula

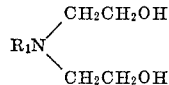

wherein $R_1$ is an alkyl or alkenyl group of 8 to 22 carbon atoms, has an antistatic effect. But when a synthetic resin containing it is made into a film, the film will be lower in the antiblocking property, printing characteristics and heat-sealability.

The present inventors have discovered that, by converting the above-mentioned alkyl (or alkenyl) dihydroxyethylamines to the higher carboxylates thereof, the above-mentioned defects can be eliminated. The present inventors have further discovered that, by adding a proper amount of a higher alcohol to such higher carboxylates, excellent effects can be obtained.

That is to say, it has been found that, when the above-mentioned alkyl (or alkenyl) dihydroxyethylamine is incorporated in a resin which is then made into a film, the film will have a blocking property as described above and that, when the resin is made as a molding, it will tend to be sticky on the surface. However, when a higher carboxylate of alkyl or alkenyl dihydroxyethylamine is incorporated in the resin the antiblocking property of the films and moldings will be remarkably improved. It has been further found that, in such case, the antistatic property will be somewhat reduced. However, this effect can be overcome by mixing a proper amount of a higher aliphatic alcohol in said carboxylate so that very favorable results will be obtained for all of the antistatic property, antiblocking property, printing characteristics and heat-sealability.

These characteristics are tabulated as follows:

| Tested items | Kinds of antistatic agents | | |
|---|---|---|---|
| | Alkyl (or alkyenyl) dihydroxyethylamine | Alkyl (or alkenyl) dihydroxyethylamine higher carboxylate (I) | (I) + higher alphiphatic alcohol (II) |
| Antistatic property | High | Rather high | High. |
| Antiblocking property | Low | Very high | Very high. |
| Printing characteristics | Low | do | Do. |
| Heat-sealability | Low | do | Do. |

The alkyl (or alkenyl) dihydroxyethylamine higher carboxylates and higher aliphatic alcohols used in the present invention are selected from among those containing alkyl or alkenyl groups of 8 to 22 carbon atoms. Those of alkyl or alkenyl groups having not more than 7 carbon atoms are so low in their boiling points as to be likely to evaporate and disperse while they are being incorporated into the resin. Those of 23 carbon atoms or more are so difficult to industrially acquire as raw materials that they are not desirable.

Examples of compounds of the above Formulas I and II which are particularly suitably used for the present invention are those in which each of $R_1$, $R_2$ and $R_3$ is capryl, decyl, lauryl, myristyl, cetyl, stearyl or oleyl.

The proper amount of the alkyl (or alkenyl) dihydroxyethylamine higher carboxylate to be added to a synthetic resin, when the higher carboxylate is used alone, will be varied depending on the kind of the resin to be used and the thickness of the film or molding but it is generally 0.1 to 2% (percent being by weight here and also hereinafter). Usually best results are obtained when the higher carboxylate is used in the following amounts: 0.3 to 0.7% for polyethylene films; 0.5 to 1% for polyethylene moldings; 0.5 to 1% for polypropylene films; and 0.7 to 1.5% for polypropylene moldings. For soft vinyl chloride resins, the same amounts as for polyethylenes may be added. When a mixture of the higher carboxylate and a higher aliphatic alcohol is used, the weight ratio of the higher aliphatic alcohol to the alkyl (or alkenyl) dihydroxyethylamine higher carboxylate is generally in the range of 1:10 to 10:1 and is preferably 2:1 to 4:3. Further, the amount of the mixture of the higher carboxylate and the higher aliphatic alcohol to be added to the resin to be used is 0.1 to 2% but is different depending on the kind of the resin to be used and the thickness of the film or molding. Best results are obtained when the mixture is used in the following amounts: 0.1 to 0.5% for polyethylene films; 0.3 to 1.0% for polyethylene moldings; 0.3 to 0.7% for polypropylene films; and 0.5 to 1% for polypropylene molding. Further, for soft vinyl chloride resins, substantially the same amounts as for polyethylenes may be added.

The synthetic resin to which the antistatic agent of the present invention has been added can be made into any kind of molding, sheet or film by any of the ordinary processes such as, for example, pressing, injection molding, blow molding and extrusion molding.

The antistaticizing method by the present invention is very easy to practice. For example, the antistatic agent can be mixed into pellets of the synthetic resin and any kind of product can be obtained by using any kind of molding machine. Alternatively, the agent can be mixed into the raw material from which the pellets are made and then the pellets containing the antistatic agent may be molded.

The products prepared by the present invention show an antistatic effect in all uses. For example, when such product is strongly rubbed with a blanket and is then held above cigarette ash, no ash will be deposited on it. Further, electric shocks by static electricity in processing a film at a high speed can also be prevented. In the present invention, owing to the fact that the antistatic agent is incorporated in the synthetic resin, the antistatic property is permanent and the deposition of dust by static electricity while the product is stored can be prevented.

Examples of the present invention shall be given in the following. The antistatic effect here is represented by the surface resistivity value measured by using an oscillation capacity type very high resistance measuring device at a temperature of 25° C. and at a relative humidity of 56%.

EXAMPLE 1

Each of antistatic agents stearyl dihydroxyethylamine (A), its stearate (B) and a mixture of said stearate and stearyl alcohol mixed at a weight ratio of 2:1 (C) was respectively added to a polyethylene (Showlex No. 5003 produced by Japan Olefin Chemicals Company, Ltd.). Each mixture was uniformly mixed by being kneaded with heated rolls for 10 minutes and was hot-pressed at 170° C. The surface resistivity and cigarette ash deposition on each sheet thus obtained were tested. The results are listed in the following table. A sheet made without adding any antistatic agent is represented by D in the table.

| | Amount if antistatic agent added to 100 parts of the polyethylene | Surface resistivity | Test of deposition of cigarette ash (See Note 1.) |
|---|---|---|---|
| A | 0.5 | $10^{12}$ | Some ash was deposited. |
|   | 0.7 | $10^{11}$ | Little ash was deposited. |
| B | 0.5 | $10^{13}$ | Some ash was deposited. |
|   | 0.7 | $10^{12}$ | Do. |
| C | 0.5 | $10^{10}$ | No ash was deposited at all. |
| D | | $\leq 10^{17}$ | Much ash was deposited. |

Note 1.—Ash was well crushed for 10 to 30 minutes after it was made. The state of deposition of the ash on the sheet when the sheet was held about 1 mm. above the ash was observed with the naked eye and was judged.

In the above table, in the case of A, the additive bled and a phenomenon of a sticky surface was seen. This tendency became greater with the passage of time after the production. But, in B and C, such phenomenon was not seen.

EXAMPLE 2

Each of antistatic agents lauryl dihydroxyethylamine (E), lauryl dihydroxyethylamine laurate (F), a mixture of said laurate and stearyl alcohol at a weight ratio of 4:3 (G) was respectively added to a polyethylene (Sumikathene F 702–2 produced by Sumitomo Chemical Company, Ltd.) and an inflation film was made from each mixture by using an extruder. The surface resistivity and other performances of each film were tested.

The results were as follows. A sheet made without adding any antistatic agent is represented by H in the table.

| | Amount of antistatic agent (in parts) added to 100 parts of the polyethylene | Surface resistivity (in Ω) | Test of deposition of cigarette ash (See Note 1.) |
|---|---|---|---|
| E | 0.1 | $10^{12}$ | Some ash was deposited. |
|   | 0.2 | $5\times10^{11}$ | Little ash was deposited. |
| F | 0.2 | $10^{13}$ | Some ash was deposited. |
|   | 0.5 | $10^{12}$ | Little ash was deposited |
| G | 0.2 | $10^{10}$ | No ash was deposited at all. |
| H | | $\leq 10^{17}$ | Much ash was deposited. |

| | Antiblocking property (in g./cm.) See Note 2. | Printing characteristics (See Note 3) | | Heat-sealability (See Note 4.) |
|---|---|---|---|---|
| | | Cello-tape test | Surface wearing test | |
| E | 10 (very low) | Perfectly peeled | Peeled | Low. |
|   | 20 (very low) | do | do | Low. |
| F | (High) | Partly peeled | Little peeled | High. |
|   | do | do | do | Do. |
| G | 2.1 (high) | do | do | Do. |
| H | 3.0 (high) | do | do | Do. |

Note 1.—Judged by the same method as in Example 1.
Note 2.—A load of 5 kg. was applied to two films 30×25 cm. at 50° C. for 2 hours and then the force required to peel the films off each other was measured (ASTM D1893–61T)
Note 3.—The sample was painted with 1.5 ml. of Osaka Ink No. 140 Green with a doctor blade and was left at the room termperature for one day and night and then the printing characteristics were judged in the following manner:
Cellophane adhesive tape: A cellophane adhesive tape was pasted on the above-mentioned sample, was uniformly pressed by hand and was then quickly peeled off to judge the characteristics.
Surface wearing test: The above mentioned sample and a gauze were reciprocated 2000 times at 35 times/min. under a load of 500 g. with a dyeing fastness tester and the results were judged with the naked eye.
Note 4.—Two films of 30×25 cm. were pressed at 100° C. under 5 atmospheres pressure for 3 seconds so as to be sealed and were then peeled off each other by hand to judge the heat-sealability.

As in the above table, the lauryl dihydroxyethylamine (E) was somewhat higher in the antistatic property than its laurate but was so low in the antiblocking property that the mouth of the inflation film was hard to open, the surface was sticky and therefore, though substantially no dust was deposited by static electricity, large dust pieces were more likely to be deposited by gravity than in the case of H to which no agent was added.

In the cellophane adhesive tape test and surface wearing test on the printing characteristics, there was substantially no difference among G, H and F but E was evidently lower than the above three in the naked eye judgment. Further, in the heat-sealability, too, the above three were substantially the same but E was lower than them.

EXAMPLE 3

Each of antistatic agents myristyl dihydroxyethylamine (I), myristyl dihydroxyethylamine stearate (J) and a mixture of said stearate and lauryl alcohol at a weight ratio of 2:1 (K) was respectively added to a polypropylene (Polypro No. 1011 produced by Chisso Corporation, Ltd.) and a molded plate was made from each mixture by using an injection molding machine. The results of the performance tests of such molded plates are shown in the following. A plate molded without adding any antistatic agent is represented by L in the table.

| | Amount of antistatic agent (in parts) added to 100 parts of the propylene | Surface resistivity (in Ω) | Test of deposition of cigarette ash (See Note 1) |
|---|---|---|---|
| I | 0.5 | $10^{12}$ | Some ash was deposited. |
| J | 0.5 | $10^{13}$ | Do. |
|   | 0.8 | $10^{11}$ | No ash was deposited at all. |
| K | 0.5 | $10^{11}$ | Do. |
| L |     | $\geq 10^{17}$ | Much ash was deposited. |

NOTE 1.—Judged by the same method as in Example 1.

The molded plate I was sticky on the surface with the passage of days after the molding. The plates J and K were exactly the same as in the plate L and showed no such tendency.

EXAMPLE 4

Each of antistatic agents stearyl dihydroxyethylamine (M), its laurate (N) and a mixture of said laurate and myristyl alcohol at a weight ratio of 4:3 (O) was respectively added to a soft vinyl chloride resin (Vinyl Chloride 100:DOP50 produced by Japanese Geon Company, Ltd.) and a film was made from each mixture on calendar rolls. The film P with no addition of any antistatic agent was also made in the same manner. The comparisons of the antistatic properties and other features of these films were as follows:

| | Amount of antistatic agent (in parts) added to 100 parts of the soft vinyl chloride resin | Surface resistivity (in Ω) | Test of deposition of cigarette ash (See Note 1) |
|---|---|---|---|
| M | 0.5 | $10^{12}$ | Little ash was deposited. |
| N | 0.5 | $10^{13}$ | Some ash was deposited. |
|   | 1.0 | $10^{12}$ | Little ash was deposited. |
| O | 0.5 | $10^{10}$ | No ash was deposited at all. |
| P |     | $\geq 10^{17}$ | Much ash was deposited. |

NOTE 1.—Judged by the same method as in Example 1.

The film M bled severely and became sticky with the passage of days on the surface and became hard to peel when rolled. But no such tendency was seen in the films N and O. The film P was also in exactly the same state as films N and O.

EXAMPLE 5

Each of antistatic agents oleyl dihydroxyethylamine (Q) used instead of the stearyl dihydroxyethylamine in Example 1, its stearate (R) and a mixture of said stearate and stearyl alcohol at a weight ratio of 2:1 (S) was respectively added as in Example 1 and a sheet was made from each mixture. The results of testing the surface resistivity values and antiblocking properties of such sheets were of the same tendency as in the sheets A, B and C in Example 1.

The embodiments of the invention in which an exclusive property or privilege is claimed are defined as follows:

1. An antistatic resin composition comprising (a) a synthetic resin selected from the group consisting of polyethylene, polypropylene and polyvinyl chloride and (b) a mixture of a higher fatty acid salt of a dihydroxyethylamine of the formula:

$$R_1N\begin{matrix}CH_2CH_2OH\\ \\ CH_2CH_2OH\end{matrix} \cdot R_2COOH$$

and a higher aliphatic alcohol of the formula:

$$R_3OH$$

wherein each of $R_1$, $R_2$ and $R_3$ is selected from the group consisting of alkyl and alkenyl of 8 to 22 carbon atoms, the ratio of said higher fatty acid salt of dihydroxyethylamine to said higher alcohol is from 1:10 to 10:1 by weight and the amount of said mixture contained in said synthetic resin being from 0.1 to 2% by weight.

2. The antistatic synthetic resin composition according to claim 1, in which each of $R_1$, $R_2$ and $R_3$ is selected from the group consisting of capryl, decyl, lauryl, myristyl, cetyl, stearyl and oleyl.

3. An antistatic agent composition for synthetic resins comprising a higher fatty acid salt of a dihydroxyethylamine of the formula:

$$R_1N\begin{matrix}CH_2CH_2OH\\ \\ CH_2CH_2OH\end{matrix} \cdot R_2COOH$$

and a higher aliphatic alcohol of the formula:

$$R_3OH$$

wherein each of $R_1$, $R_2$ and $R_3$ is selected from the group consisting of alkyl and alkenyl of 8 to 22 carbon atoms, the ratio of said higher fatty acid salt of dihydroxyethylamine to said higher alcohol is from 1:10 to 10:1 by weight.

4. The antistatic agent composition according to claim 3, in which each of $R_1$, $R_2$ and $R_3$ is selected from the group consisting of capryl, decyl, lauryl, myristyl, cetyl, stearyl and oleyl.

References Cited

UNITED STATES PATENTS

| 2,525,691 | 10/1950 | Lee et al. | 260—33.4 |
| 2,992,199 | 7/1961 | Coler et al. | 260—23 |
| 3,230,190 | 1/1966 | Moulton et al. | 260—23 |

FOREIGN PATENTS

| 229,884 | 2/1959 | Australia. |

DONALD E. CZAJA, Primary Examiner

D. J. BARRACK, Assistant Examiner

U.S. Cl. X.R.

260—92.8, 93.7, 94.9